US012775388B2

(12) United States Patent
Wang et al.

(10) Patent No.: US 12,775,388 B2
(45) Date of Patent: Oct. 27, 2026

(54) CROSS-TEMPERATURE MEASUREMENT OF A MEMORY SYSTEM

(71) Applicant: Micron Technology, Inc., Boise, ID (US)

(72) Inventors: Zheng Wang, Louisville, CO (US); Zoltan Szubbocsev, Unterschleissheim (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/202,995

(22) Filed: May 8, 2025

(65) Prior Publication Data

US 2025/0383783 A1 Dec. 18, 2025

Related U.S. Application Data

(60) Provisional application No. 63/660,920, filed on Jun. 17, 2024.

(51) Int. Cl.
*G06F 3/06* (2006.01)

(52) U.S. Cl.
CPC .......... *G06F 3/0614* (2013.01); *G06F 3/0653* (2013.01); *G06F 3/0688* (2013.01)

(58) Field of Classification Search
CPC ..... G06F 3/0614; G06F 3/0653; G06F 3/0688
See application file for complete search history.

(56) References Cited

U.S. PATENT DOCUMENTS

2017/0285944 A1* 10/2017 Wang ........................ G11C 7/04
2024/0094926 A1* 3/2024 Zhao ...................... G06F 3/0625

* cited by examiner

*Primary Examiner* — Chie Yew
(74) *Attorney, Agent, or Firm* — Holland & Hart LLP

(57) ABSTRACT

Methods, systems, and devices for cross-temperature measurement of a memory system are described. A memory system may record cross-temperature measurements during operation. For example, the memory system may record, at a first time, a temperature of data stored at the memory system and may compare the recorded temperature at the first time with a write temperature of the data that was recorded at a second time. In some examples, recording the temperature of the data at the first time may be part of performing a read operation or may be part of performing one or more maintenance operations. A difference between the temperature of the data at the first time and the write temperature may be stored at the memory system.

22 Claims, 5 Drawing Sheets

CROSS-TEMPERATURE MEASUREMENT OF A MEMORY SYSTEM

CROSS REFERENCE

The present Application for patent claims priority to U.S. Patent Application No. 63/660,920 by Wang et al., entitled "CROSS-TEMPERATURE MEASUREMENT OF A MEMORY SYSTEM," filed Jun. 17, 2024, which is assigned to the assignee hereof, and which is expressly incorporated by reference in its entirety herein.

TECHNICAL FIELD

The following relates to one or more systems for memory, including cross-temperature measurement of a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
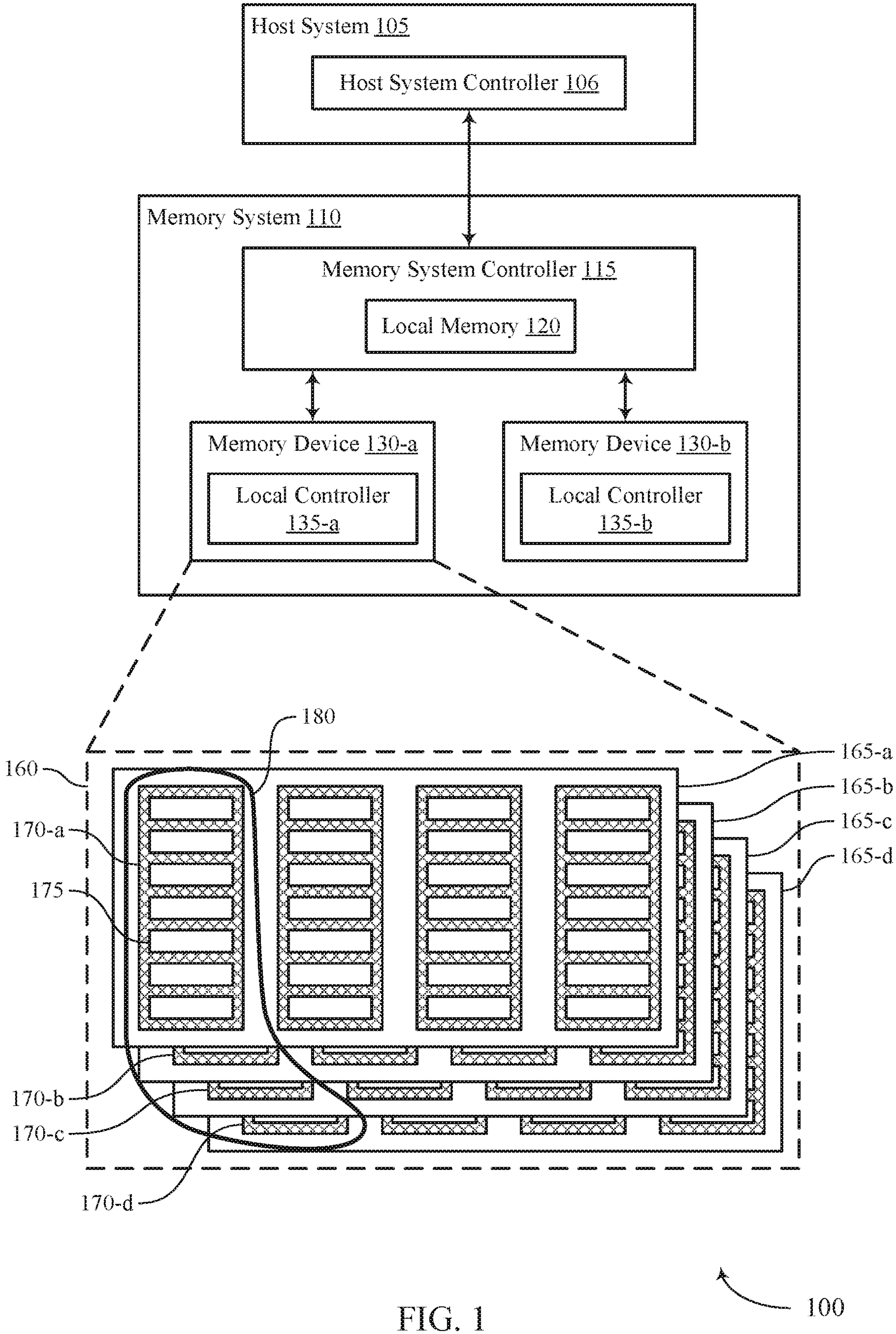
FIG. 1 shows an example of a system that supports cross-temperature measurement of a memory system in accordance with examples as disclosed herein.

In some memory systems, data may be written and read at different operating temperatures. Such instances, which may be referred to as cross-temperature conditions, may occur when a host system writes data to the memory system at a first temperature (e.g., when the memory system is operating at a first temperature) and subsequently reads the data at a second temperature different from the first temperature. The cross-temperature condition may cause stress to the memory system and may result in read errors or read failures. For example, the cross-temperature condition may cause a shift in a read voltage of data read from the memory system, which may cause one or more errors (e.g., bit errors, flipped bits) during read operations. In some examples, the memory system may employ various techniques to reduce the likelihood of cross-temperature conditions or to mitigate the impacts caused by cross-temperature conditions. However, techniques employed by the memory system to mitigate the cross-temperature condition may have undesired effects on other capabilities or on host performance (e.g., terabytes written (TBW)). Thus, it may be beneficial for the memory system to have access to information that indicates a severity or a frequency of cross-temperature conditions to inform a mitigation strategy for the cross-temperature conditions while reducing the undesired effects.

In accordance with examples described herein, the memory system may record cross-temperature measurements during operation. For example, the memory system may determine, at a first time, a temperature of the memory system during a write operation. The memory system may determine a temperature of the memory system at a second time, for example when the data is subsequently read. When the difference between the temperatures satisfies a condition (e.g., a threshold, a threshold value), an indication of the difference in temperatures may be stored to the memory system and may be used to generate a cross-temperature model. By collecting the cross-temperature measurements and generating a model, the memory system may support increased reliability of data storage and increased host performance by enabling an improved product design of the memory system and enabling the memory system to properly mitigate cross-temperature degradations.

In addition to applicability in memory systems as described herein, techniques for cross-temperature measurement of a memory system may be generally implemented to improve the sustainability of various electronic devices and systems. As the use of electronic devices has become even more widespread, the amount of energy used, and harmful emissions associated with production of electronic devices and device operation has increased. Further, the amount of waste (e.g., electronic waste) associated with disposal of electronic devices may also pose environmental concerns. Implementing the techniques described herein may improve the impact related to electronic devices by eliminating production processes and enabling efficient product design decisions, which may result in lowered production emissions and reduced electronic waste, as well as extending the life of electronic devices, among other benefits.

Features of the disclosure are illustrated and described in the context of systems, devices, and circuits. Features of the disclosure are further illustrated and described in the context of architectures and flowcharts.

FIG. 1 shows an example of a system 100 that supports cross-temperature measurement of a memory system in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIM M), a small outline DIM M (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (A SIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (M LCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some memory systems, data may be written and read at different operating temperatures. Such instances, which may be referred to as cross-temperature conditions, may occur when a host system 105 writes data to the memory system 110 at a first temperature (e.g., when the memory system is operating at a first temperature) and subsequently reads the data at a second temperature different from the first temperature. The cross-temperature condition may cause stress to the memory system 110 and may result in read errors or read failures. For example, the cross-temperature condition may cause a shift in a read voltage of data read from the memory system 110, which may cause one or more errors (e.g., bit errors, flipped bits) during read operations. In some examples, the memory system 110 may employ various techniques to reduce the likelihood of cross-temperature conditions or to mitigate the impacts caused by cross-temperature conditions. However, techniques employed by the memory system 110 to mitigate the cross-temperature condition may have undesired effects on other capabilities or on host performance (e.g., TBW). Thus, it may be beneficial for the memory system 110 to have access to information that indicates a severity or a frequency of cross-temperature conditions to inform a mitigation strategy for the cross-temperature conditions while reducing the undesired effects.

In accordance with examples described herein, the memory system 110 may record cross-temperature measurements during operation. For example, the memory system controller 115 may determine, at a first time, a temperature of the memory system 110 during a write operation. The memory system controller 115 may determine a temperature of the memory system 110 at a second time, for example when the data is subsequently read. When the difference between the temperatures satisfies a condition (e.g., a threshold, a threshold value), an indication of the difference in temperatures may be stored to the memory system 110 and may be used to generate a cross-temperature model. By collecting the cross-temperature measurements and generating a model, the memory system 110 may support increased reliability of data storage and increased host system 105 performance by enabling an improved product design of the memory system 110 and enabling the memory system 110 to properly mitigate cross-temperature degradations.

Figure 2:
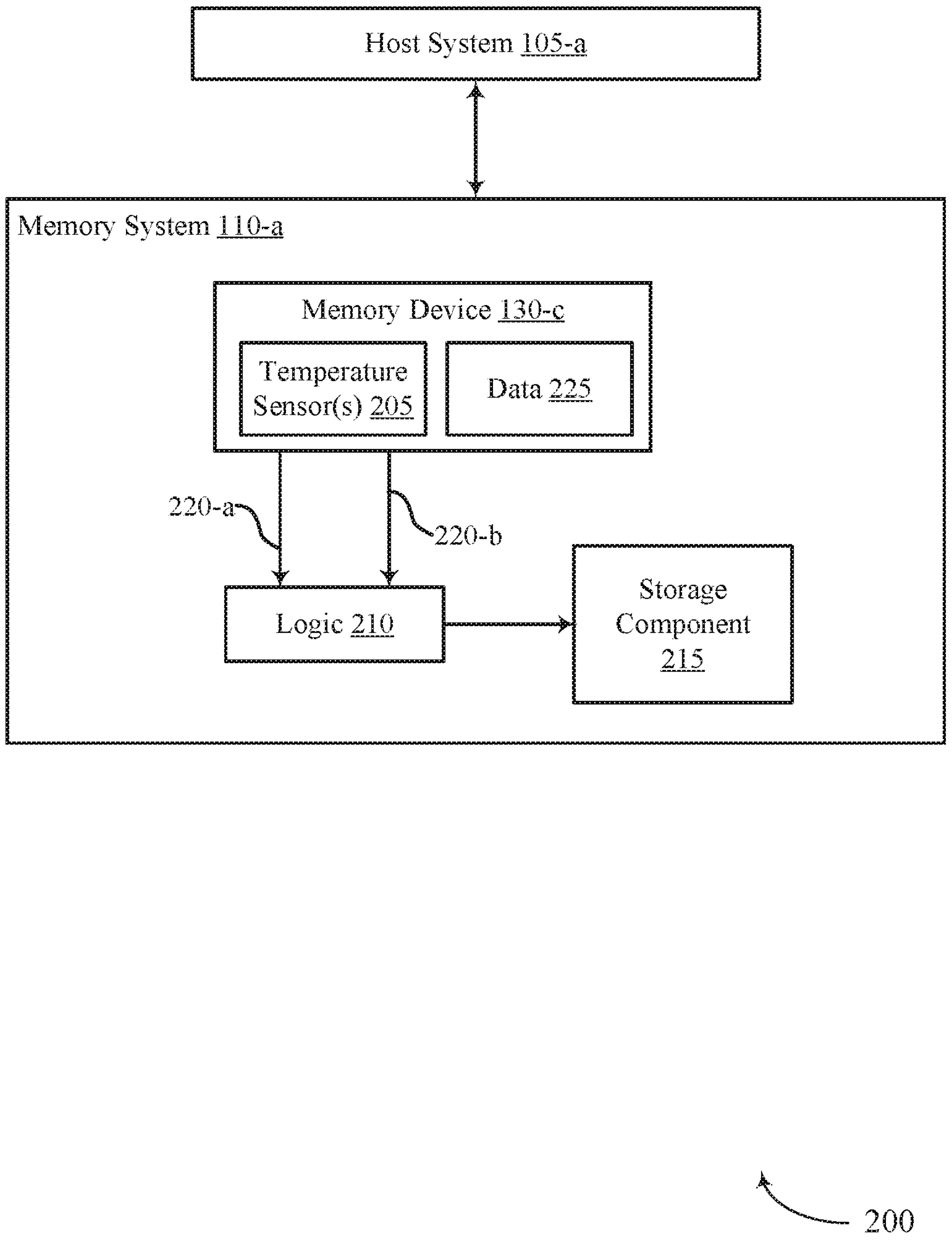
FIG. 2 shows an example of an architecture that supports cross-temperature measurement of a memory system in accordance with examples as disclosed herein.

FIG. 2 shows an example of an architecture 200 that supports cross-temperature measurement of a memory system in accordance with examples as disclosed herein. The architecture 200 may implement or may be implemented by aspects of a system 100. For example, the architecture 200 may include a host system 105-*a*, a memory system 110-*a*, and a memory device 130-*c*, which may be examples of corresponding devices described herein.

The memory device 130-*c* may include, or may be coupled with, one or more temperature sensors 205. The temperature sensor(s) 205 may measure a temperature of the memory device 130-*c*, or of one or more components of the memory device 130-*c*. For example, the temperature sensor(s) 205 may measure a temperature of a die (e.g., a die 160), a block (e.g., a block 170), a word line group (e.g., a page 175), or a plane (e.g., a plane 165). In some examples, the memory system 110-*a* may utilize the temperature sensor(s) 205 to determine a cross-temperature condition of the memory system 110.

A cross-temperature condition of the memory system 110-*a* may occur if data 225 is written to the memory device 130-*c* at a first temperature, and the data 225 (e.g., the same data 225) is read from the memory device 130-*c* at a second temperature different from the first temperature. The first temperature may be less than the second temperature (e.g., cold-to-hot cross-temperature condition), or the first temperature may be greater than the second temperature (e.g., hot-to-cold cross-temperature condition). In either instance, the memory system 110-*a* may experience undesirable effects such as a shifted a read voltage (e.g., an optimal read voltage, a configured read voltage) of data 225 stored at the memory system 110, which may cause read errors (e.g., bit errors) or read failures.

In accordance with examples described herein, the memory system 110 may collect statistics of cross-temperature events at the memory system 110. For example, the memory system 110 may collect cross-temperature data that indicates a difference between a first temperature of data 225 stored at the memory system 110 during a write of the data 225 and a second temperature of the data 225 during a read of the data (e.g., or during any time after the write of the data 225). The cross-temperature data may be collected and recorded over a duration (e.g., during a life cycle of the memory system 110-*a*), and the cross-temperature information may be aggregated across multiple memory systems 110.

To support collection of the cross-temperature data, the memory system 110-*a* may determine that data 225 is written to the memory device 130-*c* at a temperature 220-*a*. For example, the data 225 may be written to the memory device 130-*c*, and as part of writing the data 225, the temperature sensor(s) 205 may measure and record the temperature 220-*a* (e.g., a write temperature, a program temperature). In some examples, the memory system 110-*a* may store the temperature 220-*a* (e.g., in a storage component 215). The temperature sensor(s) 205 may measure and record the data at various granularities. For example, the temperature sensor(s) 205 may measure a temperature at the memory device 130-*c*, a temperature at a word line group (e.g., a page 175) that includes the data 225, a temperature at a block (e.g., a block 170) that includes the data 225, a temperature at a plane (e.g., a plane 165) that includes the data, or a combination thereof. In some examples, a granularity associated with the temperature measurement may be configured by the host system 105-*a* or may be determined by the memory system 110-*a* (e.g., a memory system controller 115).

The memory system 110 may read the data 225. In some examples, as part of reading the data, the temperature sensor(s) 205 may measure a temperature 220-*b* of the data at the time of the read. A granularity (e.g., die, word line group, block) of the measurement of the temperature 220-*b* may be the same as a granularity of the measurement of the temperature 220-*a*. For example, the memory system 110-*a* may retrieve (e.g., read) the recorded temperature 220-*a* and may determine that the temperature 220-*a* is associated with a component (e.g., a granularity) of the memory system 110-*a* (e.g., die, word line group, block). The memory system 110 may configure the temperature sensor(s) 205 to measure and/or record the temperature 220-*b* at the component (e.g., at the same component, at the same granularity) at the time of the read. In some examples, the temperature 220-*b* may be stored to one or more volatile memory cells of the memory system 110. The memory system 110-*a* may input the temperature 220-*a* and the temperature 220-*b* to logic 210 (e.g., a comparator) and may determine a difference (e.g., in Celsius or in Fahrenheit) between the temperature 220-*a* and the temperature 220-*b*. The memory system 110 may store an indication of the difference between the temperatures 220 (e.g., the temperature 220-*a* and the temperature 220-*b*) in a storage component 215.

In some examples, the storage component 215 may include registers (e.g., counters) that record a quantity of instances that a difference between the temperatures 220 (e.g., write temperature 220-*a* and read temperature 220-*b* associated with the data 225) is within a particular range (e.g., above a minimum threshold value and/or below a maximum threshold value), as shown in Table 1. In an illustrative example, the memory system 110 may determine a difference between the temperatures 220 is 18 degrees Celsius, and the memory system 110 may increment (e.g., by one) a counter (e.g., $M_0$) in a first register of the storage component 215 associated with temperature values that are less than 20 degrees Celsius. At a different time (e.g., a later time), the memory system 110 may determine that a difference between the temperatures 220 (e.g., write temperature 220-*a* and read temperature 220-*b* associated with the data 225) is 22 degrees Celsius, and the memory system 110 may increment (e.g., by one) a counter (e.g., $M_1$) in a second register of the storage component 215 associated with temperature values in a range between 20 degrees Celsius and 30 degrees Celsius.

TABLE 1

| Temperature Difference | Quantity of Instances |
|---|---|
| <20 | $M_0$ |
| [20, 30) | $M_1$ |
| [30, 40) | $M_2$ |
| [40, 50) | $M_3$ |
| [50, 60) | $M_4$ |
| [60, 70) | $M_5$ |
| [70, 80) | $M_6$ |
| [80, 90) | $M_7$ |
| [90, 100) | $M_8$ |
| ≥100 | $M_9$ |

In some examples, the storage component 215 may include a first set of registers (e.g., in accordance with Table 1) to record temperature differences (e.g., deltas) in cases (e.g., cold-to-hot cross-temperature events) where the temperature 220-*b* (e.g., the read temperature) is greater than the temperature 220-*a* (e.g., the write temperature). In some examples, the storage component 215 may include a second set of registers (e.g., in accordance with Table 1) to record temperature differences (e.g., deltas) in cases (e.g., hot-to-cold cross-temperature events) where the temperature 220-*b* (e.g., the read temperature) is less than the temperature 220-*a* (e.g., the write temperature).

In some examples, the temperature 220-*b* may be recorded based on performing a read of the data 225. For example, the memory system 110-*a* may receive, from the host system 105-*a*, a command to read the data 225, and the memory system 110-*a* may perform the read and record the temperature 220-*b* as part of performing the read. Additionally, or alternatively, the memory system 110-*a* may read the data 225 based on performing one or more maintenance operations. For example, the memory system 110-*a* may perform garbage collection of the data 225 or may perform a refresh of the data 225, and reading the data 225 and recording the temperature 220-*b* may be part of a garbage collection operation or a refresh operation.

In some examples, the memory system 110-*a* may store the indication of the difference between the temperatures 220 based on whether the temperature 220-*b* is stored as part of performing a read command from the host system 105-*a* or as part of performing (e.g., internally performing) maintenance operations. For example, the storage component 215 may include a first set of registers (e.g., in accordance with Table 1) to record temperature differences between the temperatures 220 in cases where the temperature 220-*b* is recorded as part of performing a read command from the host system 105-*a*. Additionally, or alternatively, the storage component 215 may include a second set of registers (e.g., in accordance with Table 1) to record temperature differences between the temperatures 220 in cases where the temperature 220-*b* is recorded as part of performing maintenance operations.

Figure 3:
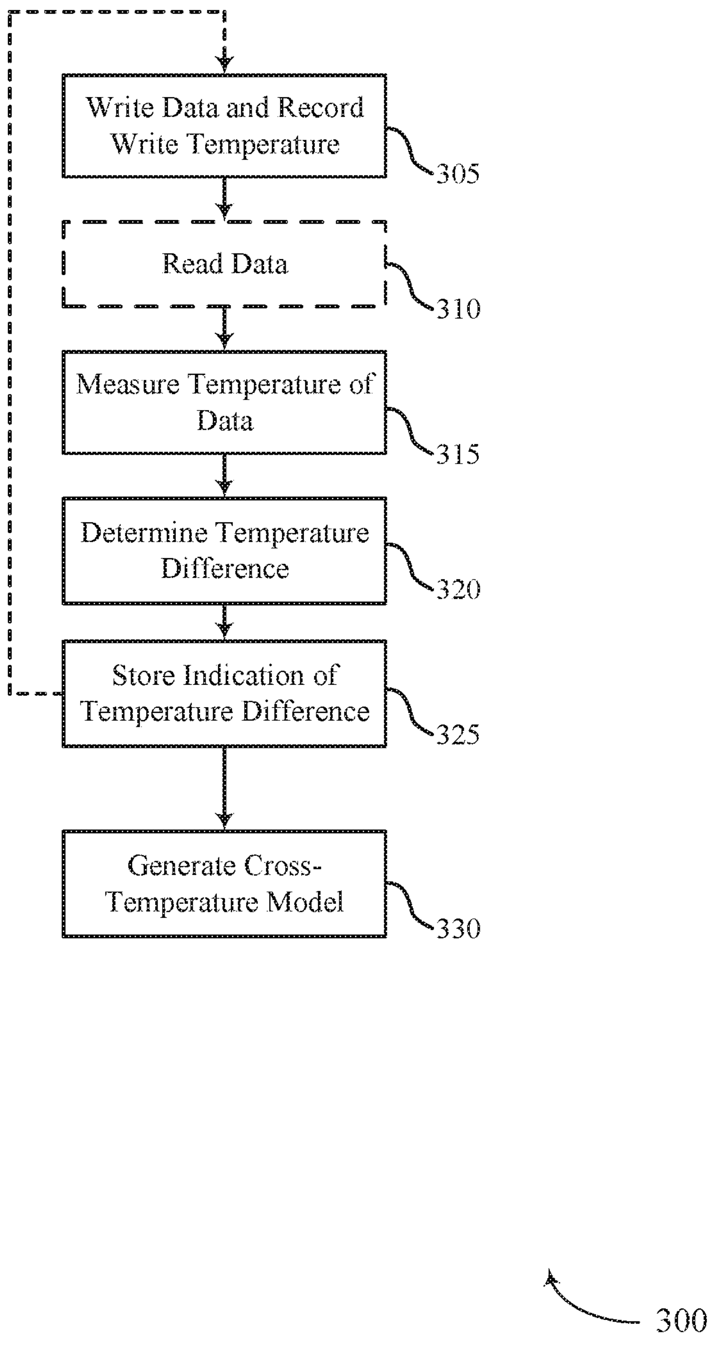
FIG. 3 shows an example of a flowchart that supports cross-temperature measurement of a memory system in accordance with examples as disclosed herein.

FIG. 3 shows an example of a flowchart 300 that supports cross-temperature measurement of a memory system in accordance with examples as disclosed herein. The flowchart 300 may implement or may be implemented by aspects of the system 100 or the architecture 200. For example, the flowchart 300 may be implemented by a memory system 110 (e.g., a memory system 110-*a*), and one or more steps performed by the memory system 110 in the flowchart 300 may be implemented in instructions or firmware stored on memory of the memory system 110 (e.g., a memory device 130) and may be executed by a memory system controller 115 (and/or a local controller 135). In the following description of flowchart 300, the operations may be performed in a different order than the order shown, or other operations may be added or removed from the flowchart 300. For example, some operations may also be left out of flowchart 300, may be performed in different orders or at different times, or other operations may be added to flowchart 300.

At 305, the memory system may write, at a first time, data. The memory system may be operating at a first temperature (e.g., a temperature 220-*a*) at the first time. The first temperature may be associated with a word line group of the memory system, a block of the memory system, or a set of blocks of the memory system. The memory system may store the first temperature to the memory system as part of writing the data.

At 310, the memory system may read the data at a second time. For example, the memory system may receive a read command (e.g., from a host system 105) at the second time and may perform a read of the data in response to the read command. In some examples, the memory system may determine that a quantity of commands (e.g., or a quantity of commands satisfying a threshold priority) in a queue of the memory system satisfies a threshold value (e.g., queue is empty, quantity of commands is less than a threshold value). Reading the data, or recording a temperature (e.g., a temperature 220-*b*) associated with the data (e.g., at 315), or both, may be based on determining that the quantity of commands in the queue of the memory system satisfies the threshold value. In some examples, the memory system may read the data at the second time as part of maintenance operations (e.g., garbage collection, refresh) that are performed on the memory system or by the memory system.

At 315, the memory system may determine (e.g., measure) a second temperature (e.g., temperature 220-*b*) associated with the memory system (e.g., associated with the data written to the memory system at 305) at a second time. In some examples, the second time may be an idle time of the memory system. In some examples, the memory system may measure the second temperature for each read command the memory system receives (e.g., from a host system 105). For example, the memory system may measure the second temperature as part of (e.g., based on) reading the data at the second time (e.g., at 310). Additionally, or alternatively, the memory system may measure the second temperature for each maintenance operation (e.g., garbage collection, reliability refresh) that is performed on the memory system.

In some examples, the memory system may measure the second temperature for a subset of read commands that the memory system receives. For example, the memory system may measure the second temperature in cases where the memory system receives a read command and the command queue of the memory system satisfies a threshold condition (e.g., queue is empty, quantity of commands satisfies a threshold value, quantity of commands of a threshold priority satisfies a threshold value). Additionally, or alternatively, the memory system may measure the second temperature in cases where the memory system receives a command to read data and a size of the data (e.g., a size of the data written to the memory system at 305) satisfies a threshold size.

In some examples, the memory system may determine (e.g., measure) the second temperature independent of any read operation (e.g., without reading the data). For example, the memory system may measure the second temperature according to a periodicity (e.g., every 10 minutes during a power-on duration of the memory system). In some examples, the periodicity may be configured at the memory system (e.g., by a host system 105). The memory system may initiate a timer (e.g., based on writing the data to the memory system at 305, based on bootup of the memory system, any other time), and measuring the second temperature may be based on an expiration of the timer. For example, based on the expiration of the timer, the memory system may select one or more logical addresses (e.g., a range of logical block addresses (LBAs)), and the memory system may measure a temperature (e.g., temperature 220-*b*) at the selected logical addresses. In some examples, selection of the one or more logical addresses for temperature measurement may be random or may be based on a pattern (e.g., a cyclic pattern, a round-robin pattern). Additionally, or alternatively, selection of the one or more logical addresses for temperature measurement may be based on a size of data stored at the one or more logical addresses satisfying a threshold.

At 320, the memory system may determine a difference (e.g., delta) between the first temperature (e.g., temperature 220-*a*) and the second temperature (e.g., temperature 220-*b*). At 325, the memory system may store an indication of the difference between the first temperature and the second temperature based on the difference between the first temperature and the second temperature satisfying a threshold value, or one or more threshold values. For example, the one or more threshold values may indicate a range of values (e.g., <20, (20,30], etc., as described with reference to Table 1) that correspond to the difference between the first temperature and the second temperature. The memory system may increment a counter (e.g., $M_0$, $M_1$, etc., as described with reference to Table 1) corresponding to a range of values based on the difference between the first temperature and the second temperature falling within the range of values.

In some examples, the memory system may store the indication of the difference between the first temperature and the second temperature in registers of a temporary storage component (e.g., local memory 120, a cache, SRAM), and the memory system may periodically transfer (e.g., flush) values from the registers to permanent storage (e.g., to NAND memory, to a memory device 130). The memory system may repeat steps 305 through 325 for a duration (e.g., configured by a host system 105), or throughout a lifetime of the memory system.

At 330, the memory system may generate a cross-temperature model of the memory system based on storing the indication of the difference between the first temperature and the second temperature. Additionally, or alternatively, the memory system may modify data associated with the cross-temperature model, or update the cross-temperature model (e.g., update a cross-temperature model previously generated) based on the stored indication of the difference between the first temperature and the second temperature. The cross-temperature model may indicate one or more reliability metrics (e.g., capabilities) of the memory system. In some examples, the memory system may adjust one or more parameters (e.g., capabilities, operating parameters, programming time, data retention parameters) of the memory system using the cross-temperature model. The one or more parameters to be adjusted may include a refresh rate of the memory system, one or more read voltages (e.g., read voltage shifts) associated with the memory system (e.g., in accordance with a read voltage calibration), a frequency of performing maintenance operations (e.g., garbage collection) or error correction operations at the memory system, among other parameters. In some examples, the memory system may transmit an indication of the cross-temperature model to a host system (e.g., a host system 105). In some examples, the host system 105 (e.g., or another device or entity) may combine (e.g., aggregate) cross-temperature models from multiple (e.g., one or more) memory systems and generate a global cross-temperature model based on the data from the multiple cross-temperature models. One or more cross-temperature models (e.g., including the global cross-temperature model) may be for (e.g., may inform, may be utilized for) optimization of processes or parameters (e.g., capabilities, operating parameters, programming time, data retention parameters) related to memory systems.

Figure 4:
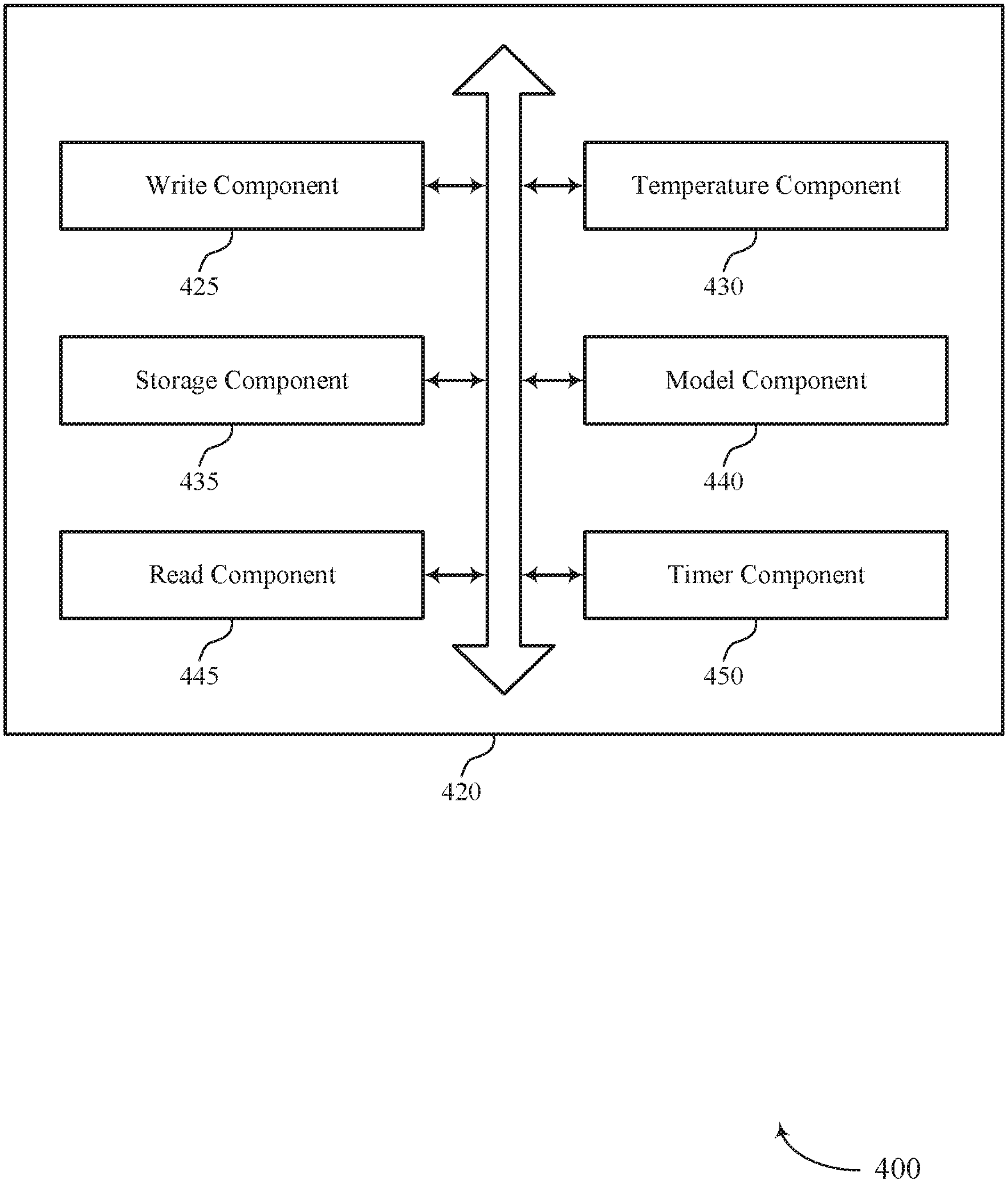
FIG. 4 shows a block diagram of a memory system that supports cross-temperature measurement of a memory system in accordance with examples as disclosed herein.

FIG. 4 shows a block diagram 400 of a memory system 420 that supports cross-temperature measurement of a memory system in accordance with examples as disclosed herein. The memory system 420 may be an example of aspects of a memory system (e.g., a memory system 110-*a*) as described with reference to FIGS. 1 through 3. The memory system 420, or various components thereof, may be an example of means for performing various aspects of cross-temperature measurement of a memory system as described herein. For example, the memory system 420 may include a write component 425, a temperature component 430, a storage component 435, a model component 440, a read component 445, a timer component 450, or any combination thereof. Each of these components, or components of subcomponents thereof (e.g., one or more processors, one or more memories), may communicate, directly or indirectly, with one another (e.g., via one or more buses).

The write component 425 may be configured as or otherwise support a means for writing, at a first time, data (e.g., data 225) to the memory system, where the memory system is operating at a first temperature (e.g., a temperature 220-*a*) at the first time. The temperature component 430 may be configured as or otherwise support a means for determining a difference between the first temperature and a second temperature (e.g., a temperature 220-*b*) associated with the memory system at a second time different from the first time, where determining the difference between the first temperature and the second temperature is based on writing the data to the memory system at the first time. The storage component 435 may be configured as or otherwise support a means for storing (e.g., in a storage component 215) an indication of the difference between the first temperature and the second temperature based on the difference between the first temperature and the second temperature satisfying a threshold value. The model component 440 may be configured as or otherwise support a means for modifying second data associated with a cross-temperature model of the memory system based on storing the indication of the difference between the first temperature and the second temperature, where the cross-temperature model is associated with one or more processes or parameters of the memory system.

In some examples, to support storing the indication of the difference between the first temperature and the second temperature, the storage component 435 may be configured as or otherwise support a means for incrementing a counter associated with a range of values based on the difference between the first temperature and the second temperature satisfying the threshold value.

In some examples, the read component 445 may be configured as or otherwise support a means for reading the data at the second time, where determining the second temperature is based on reading the data at the second time.

In some examples, the read component 445 may be configured as or otherwise support a means for receiving a read command at the second time. In some examples, the read component 445 may be configured as or otherwise support a means for determining that a quantity of commands in a queue of the memory system satisfies a second threshold value, where reading the data is based on determining that the quantity of commands satisfies the second threshold value.

In some examples, the write component 425 may be configured as or otherwise support a means for determining that a size of the data written to the memory system satisfies a third threshold value, where determining the second temperature associated with the memory system is based on the size of the data satisfying the third threshold value.

In some examples, the timer component 450 may be configured as or otherwise support a means for initiating a timer based on writing the data to the memory system, where determining the second temperature associated with the memory system is based on an expiration of the timer.

In some examples, the timer component 450 may be configured as or otherwise support a means for selecting one or more logical addresses associated with the memory system based on the expiration of the timer, where determining the second temperature associated with the memory system is based on selecting the one or more logical addresses associated with the memory system.

In some examples, the second time includes an idle time of the memory system.

In some examples, one or more maintenance operations are performed on the memory system at the second time.

In some examples, the storage component 435 may be configured as or otherwise support a means for storing the first temperature to the memory system based on writing the data to the memory system.

In some examples, the first temperature and the second temperature are associated with a word line group (e.g., a page 175) of the memory system, a block (e.g., a block 170) of the memory system, or a set of blocks (e.g., a virtual block 180) of the memory system.

In some examples, the write component 425 may be configured as or otherwise support a means for writing, at a third time, third data to the memory system of the memory system, where the memory system is associated with a third temperature at the third time. In some examples, the temperature component 430 may be configured as or otherwise support a means for determining, at a fourth time, a fourth temperature associated with the memory system based on writing the third data to the memory system at the third time. In some examples, the temperature component 430 may be configured as or otherwise support a means for determining a difference between the third temperature and the fourth temperature based on determining the third temperature at the third time. In some examples, the storage component 435 may be configured as or otherwise support a means for storing a second indication of the difference between the third temperature and the fourth temperature based on the difference between the third temperature and the fourth temperature satisfying a fourth threshold value, where generating the cross-temperature model is based on storing the second indication of the difference between the third temperature and the fourth temperature.

In some examples, the cross-temperature model is associated with one or more reliability metrics of the memory system.

In some examples, the threshold value includes a range of values associated with the difference between the first temperature and the second temperature.

In some examples, the model component 440 may be configured as or otherwise support a means for adjusting one or more parameters of the memory system using the cross-temperature model.

In some examples, the model component 440 may be configured as or otherwise support a means for generating the cross-temperature model of the memory system, where modifying the second data associated with the cross-temperature model is based on generating the cross-temperature model.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
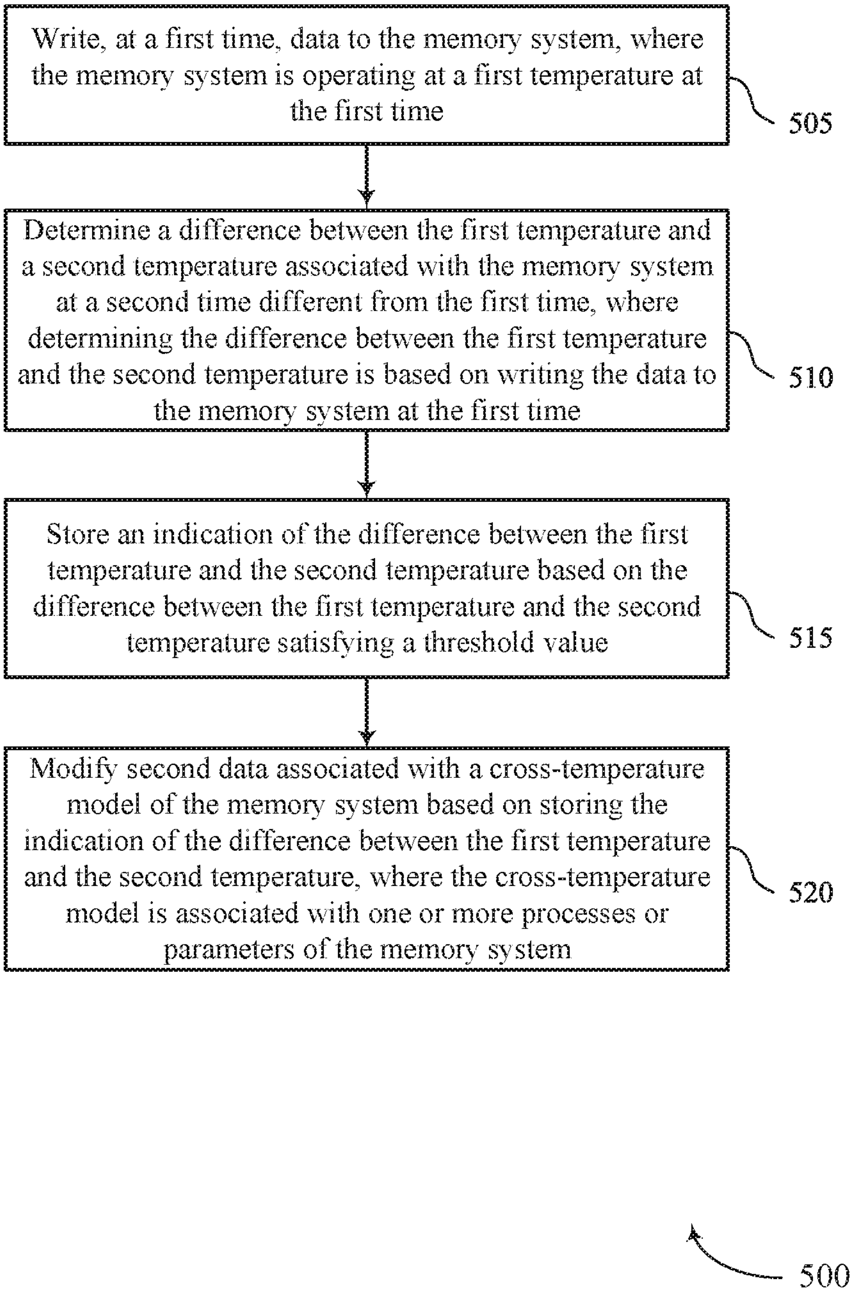
FIG. 5 shows a flowchart illustrating a method or methods that support cross-temperature measurement of a memory system in accordance with examples as disclosed herein.

FIG. 5 shows a flowchart illustrating a method 500 that supports cross-temperature measurement of a memory system in accordance with examples as disclosed herein. The operations of method 500 may be implemented by a memory system (e.g., a memory system 110-*a*) or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include writing, at a first time, data (e.g., data 225) to the memory system, where the memory system is operating at a first temperature (e.g., 220-*a*) at the first time. In some examples, aspects of the operations of 505 may be performed by a write component 425 as described with reference to FIG. 4.

At 510, the method may include determining a difference between the first temperature and a second temperature (e.g., temperature 220-*b*) associated with the memory system at a second time different from the first time, where determining the difference between the first temperature and the second temperature is based on writing the data to the memory system at the first time. In some examples, aspects of the operations of 510 may be performed by a temperature component 430 as described with reference to FIG. 4.

At 515, the method may include storing (e.g., at a storage component 215) an indication of the difference between the first temperature and the second temperature based on the difference between the first temperature and the second temperature satisfying a threshold value. In some examples, aspects of the operations of 515 may be performed by a storage component 435 as described with reference to FIG. 4.

At 520, the method may include modifying second data associated with a cross-temperature model of the memory system based on storing the indication of the difference between the first temperature and the second temperature, where the cross-temperature model is associated with one or more processes or parameters of the memory system. In some examples, aspects of the operations of 520 may be performed by a model component 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for writing, at a first time, data to the memory system, where the memory system is operating at a first temperature at the first time; determining a difference between the first temperature and a second temperature associated with the memory system at a second time different from the first time, where determining the difference between the first temperature and the second temperature is based on writing the data to the memory system at the first time; storing an indication of the difference between the first temperature and the second temperature based on the difference between the first temperature and the second temperature satisfying a threshold value; and modifying second data associated with a cross-temperature model of the memory system based on storing the indication of the difference between the first temperature and the second temperature, where the cross-temperature model is associated with one or more processes or parameters of the memory system.

Aspect 2: The method, apparatus, or non-transitory computer-readable medium of aspect 1, where storing the indication of the difference between the first temperature and the second temperature includes operations, features, circuitry, logic, means, or instructions, or any combination thereof for incrementing a counter associated with a range of values based on the difference between the first temperature and the second temperature satisfying the threshold value.

Aspect 3: The method, apparatus, or non-transitory computer-readable medium of any of aspects 1 through 2, further including operations, features, circuitry, logic, means, or instructions, or any combination thereof for reading the data at the second time, where determining the second temperature is based on reading the data at the second time.

Aspect 4: The method, apparatus, or non-transitory computer-readable medium of aspect 3, further including operations, features, circuitry, logic, means, or instructions, or any combination thereof for receiving a read command at the second time and determining that a quantity of commands in a queue of the memory system satisfies a second threshold value, where reading the data is based on determining that the quantity of commands satisfies the second threshold value.

Aspect 5: The method, apparatus, or non-transitory computer-readable medium of any of aspects 1 through 4, further including operations, features, circuitry, logic, means, or instructions, or any combination thereof for determining that a size of the data written to the memory system satisfies a third threshold value, where determining the second temperature associated with the memory system is based on the size of the data satisfying the third threshold value.

Aspect 6: The method, apparatus, or non-transitory computer-readable medium of any of aspects 1 through 5, further including operations, features, circuitry, logic, means, or instructions, or any combination thereof for initiating a timer based on writing the data to the memory system, where determining the second temperature associated with the memory system is based on an expiration of the timer.

Aspect 7: The method, apparatus, or non-transitory computer-readable medium of aspect 6, further including operations, features, circuitry, logic, means, or instructions, or any combination thereof for selecting one or more logical addresses associated with the memory system based on the expiration of the timer, where determining the second temperature associated with the memory system is based on selecting the one or more logical addresses associated with the memory system.

Aspect 8: The method, apparatus, or non-transitory computer-readable medium of any of aspects 1 through 7, where the second time includes an idle time of the memory system.

Aspect 9: The method, apparatus, or non-transitory computer-readable medium of any of aspects 1 through 8, where one or more maintenance operations are performed on the memory system at the second time.

Aspect 10: The method, apparatus, or non-transitory computer-readable medium of any of aspects 1 through 9, further including operations, features, circuitry, logic, means, or instructions, or any combination thereof for storing the first temperature to the memory system based on writing the data to the memory system.

Aspect 11: The method, apparatus, or non-transitory computer-readable medium of any of aspects 1 through 10, where the first temperature and the second temperature are associated with a word line group of the memory system, a block of the memory system, or a set of blocks of the memory system.

Aspect 12: The method, apparatus, or non-transitory computer-readable medium of any of aspects 1 through 11, further including operations, features, circuitry, logic, means, or instructions, or any combination thereof for writing, at a third time, third data to the memory system of the memory system, where the memory system is associated with a third temperature at the third time; determining, at a fourth time, a fourth temperature associated with the memory system based on writing the third data to the memory system at the third time; determining a difference between the third temperature and the fourth temperature based on determining the third temperature at the third time; and storing a second indication of the difference between the third temperature and the fourth temperature based on the difference between the third temperature and the fourth temperature satisfying a fourth threshold value, where generating the cross-temperature model is based on storing the second indication of the difference between the third temperature and the fourth temperature.

Aspect 13: The method, apparatus, or non-transitory computer-readable medium of any of aspects 1 through 12, where the cross-temperature model is associated with one or more reliability metrics of the memory system.

Aspect 14: The method, apparatus, or non-transitory computer-readable medium of any of aspects 1 through 13, where the threshold value includes a range of values associated with the difference between the first temperature and the second temperature.

Aspect 15: The method, apparatus, or non-transitory computer-readable medium of any of aspects 1 through 14, further including operations, features, circuitry, logic, means, or instructions, or any combination thereof for adjusting one or more parameters of the memory system using the cross-temperature model.

Aspect 16: The method, apparatus, or non-transitory computer-readable medium of any of aspects 1 through 15, further including operations, features, circuitry, logic, means, or instructions, or any combination thereof for generating the cross-temperature model of the memory system, where modifying the second data associated with the cross-temperature model is based on generating the cross-temperature model.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an A SIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component"

subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method by a memory system, comprising:

writing, at a first time, data to the memory system, wherein the memory system is operating at a first temperature at the first time;

determining a difference between the first temperature and a second temperature associated with the memory system at a second time different from the first time, wherein determining the difference between the first temperature and the second temperature is based on writing the data to the memory system at the first time;

storing an indication of the difference between the first temperature and the second temperature based on the difference between the first temperature and the second temperature satisfying a threshold value; and modifying second data associated with a cross-temperature model of the memory system based on storing the indication of the difference between the first temperature and the second temperature, wherein the cross-temperature model is associated with one or more processes or parameters of the memory system.

2. The method of claim 1, wherein storing the indication of the difference between the first temperature and the second temperature comprises:

incrementing a counter associated with a range of values based on the difference between the first temperature and the second temperature satisfying the threshold value.

3. The method of claim 1, further comprising:

reading the data at the second time, wherein determining the second temperature is based on reading the data at the second time.

4. The method of claim 3, further comprising:

receiving a read command at the second time; and determining that a quantity of commands in a queue of the memory system satisfies a second threshold value, wherein reading the data is based on determining that the quantity of commands satisfies the second threshold value.

5. The method of claim 1, further comprising:

determining that a size of the data written to the memory system satisfies a third threshold value, wherein determining the second temperature associated with the memory system is based on the size of the data satisfying the third threshold value.

6. The method of claim 1, further comprising:

initiating a timer based on writing the data to the memory system, wherein determining the second temperature associated with the memory system is based on an expiration of the timer.

7. The method of claim 6, further comprising:

selecting one or more logical addresses associated with the memory system based on the expiration of the timer, wherein determining the second temperature associated with the memory system is based on selecting the one or more logical addresses associated with the memory system.

8. The method of claim 1, wherein the second time comprises an idle time of the memory system.

9. The method of claim 1, wherein one or more maintenance operations are performed on the memory system at the second time.

10. The method of claim 1, further comprising:

storing the first temperature to the memory system based on writing the data to the memory system.

11. The method of claim 1, wherein the first temperature and the second temperature are associated with a word line group of the memory system, a block of the memory system, or a set of blocks of the memory system.

12. The method of claim 1, further comprising:

writing, at a third time, third data to the memory system, wherein the memory system is associated with a third temperature at the third time;

determining, at a fourth time, a fourth temperature associated with the memory system based on writing the third data to the memory system at the third time;

determining a difference between the third temperature and the fourth temperature based on determining the third temperature at the third time; and storing a second indication of the difference between the third temperature and the fourth temperature based on the difference between the third temperature and the fourth temperature satisfying a fourth threshold value, wherein generating the cross-temperature model is based on storing the second indication of the difference between the third temperature and the fourth temperature.

13. The method of claim 1, wherein the cross-temperature model is associated with one or more reliability metrics of the memory system.

14. The method of claim 1, wherein the threshold value comprises a range of values associated with the difference between the first temperature and the second temperature.

15. The method of claim 1, further comprising:

adjusting one or more parameters of the memory system using the cross-temperature model.

16. The method of claim 1, further comprising:

generating the cross-temperature model of the memory system, wherein modifying the second data associated with the cross-temperature model is based on generating the cross-temperature model.

17. A memory system, comprising:

one or more memory devices; and processing circuitry coupled with the one or more memory devices and configured to cause the memory system to:

write, at a first time, data to the memory system, wherein the memory system is operating at a first temperature at the first time;

determine a difference between the first temperature and a second temperature associated with the memory system at a second time different from the first time, wherein determining the difference between the first temperature and the second temperature is based on writing the data to the memory system at the first time;

store an indication of the difference between the first temperature and the second temperature based on the difference between the first temperature and the second temperature satisfying a threshold value; and modify second data associated with a cross-temperature model of the memory system based on storing the indication of the difference between the first temperature and the second temperature, wherein the cross-temperature model is associated with one or more processes or parameters of the memory system.

18. The memory system of claim 17, wherein storing the indication of the difference between the first temperature and the second temperature comprises the processing circuitry configured to cause the memory system to:

increment a counter associated with a range of values based on the difference between the first temperature and the second temperature satisfying the threshold value.

19. The memory system of claim 17, wherein the processing circuitry is further configured to cause the memory system to:

read the data at the second time, wherein determining the second temperature is based on reading the data at the second time.

20. The memory system of claim 19, wherein the processing circuitry is further configured to cause the memory system to:

receive a read command at the second time; and determine that a quantity of commands in a queue of the memory system satisfies a second threshold value, wherein reading the data is based on determining that the quantity of commands satisfies the second threshold value.

21. The memory system of claim 17, wherein the processing circuitry is further configured to cause the memory system to:

determine that a size of the data written to the memory system satisfies a third threshold value, wherein determining the second temperature associated with the memory system is based on the size of the data satisfying the third threshold value.

22. A non-transitory computer-readable medium storing code, the code comprising instructions executable by one or more processors to:

write, at a first time, data to a memory system, wherein the memory system is operating at a first temperature at the first time;

determine a difference between the first temperature and a second temperature associated with the memory system at a second time different from the first time, wherein determining the difference between the first temperature and the second temperature is based on writing the data to the memory system at the first time;

store an indication of the difference between the first temperature and the second temperature based on the difference between the first temperature and the second temperature satisfying a threshold value; and modify second data associated with a cross-temperature model of the memory system based on storing the indication of the difference between the first temperature and the second temperature, wherein the cross-temperature model is associated with one or more processes or parameters of the memory system.

* * * * *